US012662003B2

(12) United States Patent
Mimatsu et al.

(10) Patent No.: US 12,662,003 B2
(45) Date of Patent: Jun. 23, 2026

(54) VEHICLE CHARGING AND DISCHARGING SYSTEM AND ELECTRIC VEHICLE

(71) Applicant: SUBARU CORPORATION, Tokyo (JP)

(72) Inventors: Hayata Mimatsu, Tokyo (JP); Tomoyuki Yamamuro, Tokyo (JP); Yasufumi Tanaka, Tokyo (JP); Nobuo Morimura, Tokyo (JP); Hiroki Morika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 586 days.

(21) Appl. No.: 18/224,137

(22) Filed: Jul. 20, 2023

(65) Prior Publication Data

US 2024/0034161 A1     Feb. 1, 2024

(30) Foreign Application Priority Data

Jul. 29, 2022     (JP) ................................. 2022-121426

(51) Int. Cl.
*B60L 53/122*        (2019.01)
*B60L 53/62*         (2019.01)
*H02J 50/10*         (2016.01)

(52) U.S. Cl.
CPC .............. *B60L 53/122* (2019.02); *B60L 53/62* (2019.02); *H02J 50/10* (2016.02)

(58) Field of Classification Search
CPC .......... B60L 53/122; B60L 53/62; H02J 50/10

(Continued)

(56) References Cited

U.S. PATENT DOCUMENTS

2014/0077760 A1*  3/2014  Ichikawa .............. B60L 53/126
                                                                 320/108
2015/0001958 A1*  1/2015  Abe ........................ B60L 53/22
                                                                 307/104

(Continued)

FOREIGN PATENT DOCUMENTS

WO        2013/118274 A1     8/2013

OTHER PUBLICATIONS

A. Khaligh and S. Dusmez, "Comprehensive Topological Analysis of Conductive and Inductive Charging Solutions for Plug-In Electric Vehicles," in IEEE Transactions on Vehicular Technology, vol. 61, No. 8, pp. 3475-3489, Oct. 2012, doi: 10.1109/TVT.2012.2213104. (Year: 2012).*

*Primary Examiner* — Wenren Chen
(74) *Attorney, Agent, or Firm* — TROUTMAN PEPPER LOCKE LLP

(57)        ABSTRACT

A vehicle charging and discharging system to be applied to an electric vehicle includes a rectifier, an inverter, a relay, and a control processor. The rectifier is disposed on a charging path through which a battery of the electric vehicle is to be contactlessly charged from external equipment via a coil in the electric vehicle. The inverter is disposed on a first path from the battery to an electric power output terminal of the electric vehicle, the electric power output terminal allowing for output of electric power stored in the battery. The relay is disposed on a second path from the inverter to the coil. The control processor controls an operation state of the relay to allow the electric power stored in the battery to be contactlessly discharged to the external equipment via the inverter, the relay, and the coil on the second path.

6 Claims, 7 Drawing Sheets

(58) Field of Classification Search
USPC ......................................................... 320/109
See application file for complete search history.

(56) References Cited

U.S. PATENT DOCUMENTS

| 2020/0247248 A1* | 8/2020 | Moriya | ................... | B60L 53/12 |
| 2020/0247249 A1* | 8/2020 | Moriya | ................... | H02J 50/10 |

* cited by examiner

COMPARATIVE EXAMPLE

VEHICLE CHARGING AND DISCHARGING SYSTEM AND ELECTRIC VEHICLE

CROSS-REFERENCE TO RELATED APPLICATION

The present application claims priority from Japanese Patent Application No. 2022-121426 filed on Jul. 29, 2022, the entire contents of which are hereby incorporated by reference.

BACKGROUND

The disclosure relates to a vehicle charging and discharging system, and to an electric vehicle including the vehicle charging and discharging system.

Various techniques have been disclosed regarding a vehicle charging system, i.e., a charging system to be applied to an electric vehicle. Reference is made to International Publication No. WO2013/118274, for example.

SUMMARY

An aspect of the disclosure provides a vehicle charging and discharging system to be applied to an electric vehicle. The vehicle charging and discharging system includes a rectifier, an inverter, a relay, and a control processor. The rectifier is disposed on a charging path through which a battery of the electric vehicle is to be contactlessly charged from external equipment via a coil in the electric vehicle. The inverter is disposed on a first path from the battery to an electric power output terminal of the electric vehicle, the electric power output terminal allowing for output of electric power stored in the battery. The relay is disposed on a second path from the inverter to the coil. The control processor is configured to control an operation state of the relay to allow the electric power stored in the battery to be contactlessly discharged to the external equipment via the inverter, the relay, and the coil on the second path.

An aspect of the disclosure provides an electric vehicle including a vehicle charging and discharging system to be applied to an electric vehicle. The vehicle charging and discharging system includes a rectifier, an inverter, a relay, and a control processor. The rectifier is disposed on a charging path through which a battery of the electric vehicle is to be contactlessly charged from external equipment via a coil in the electric vehicle. The inverter is disposed on a first path from the battery to an electric power output terminal of the electric vehicle, the electric power output terminal allowing for output of electric power stored in the battery. The relay is disposed on a second path from the inverter to the coil. The control processor is configured to control an operation state of the relay to allow the electric power stored in the battery to be contactlessly discharged to the external equipment via the inverter, the relay, and the coil on the second path.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
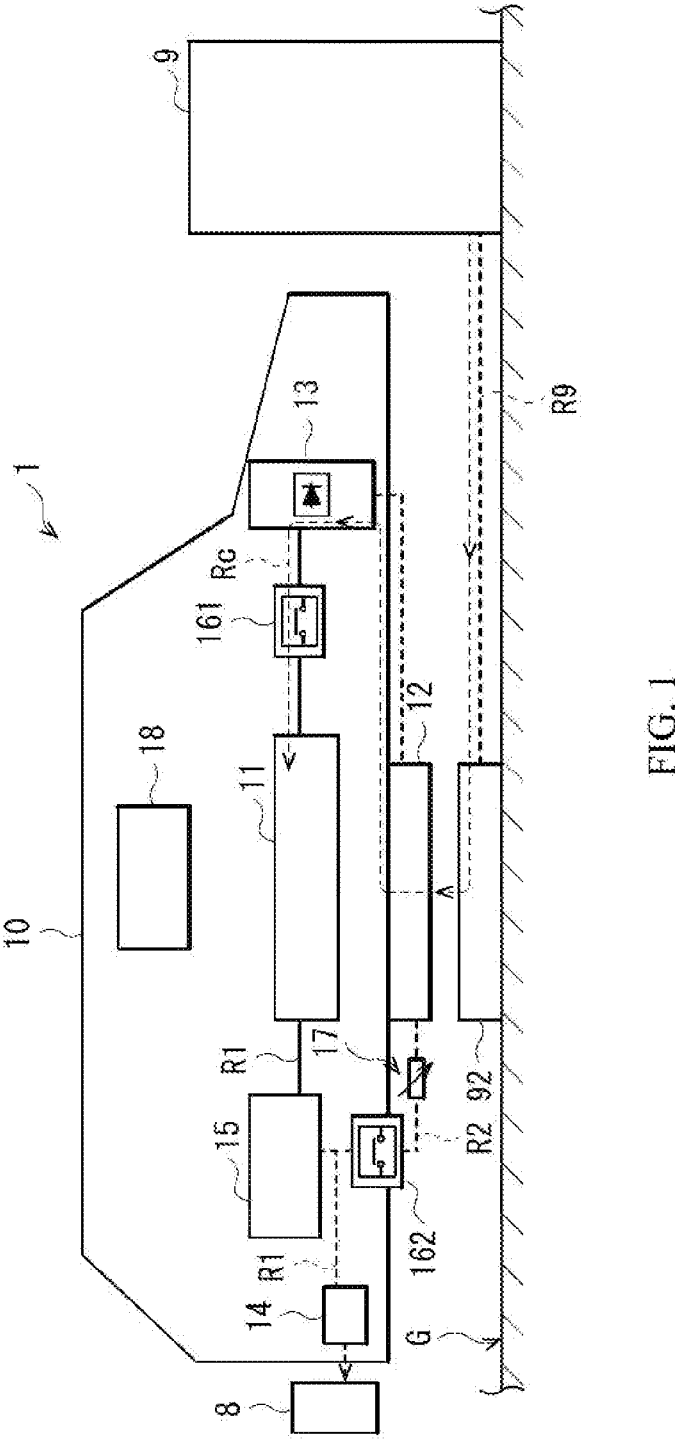
FIG. 1 is a block diagram illustrating a schematic configuration example of an electric vehicle according to one example embodiment of the disclosure, together with external elements.

It is desired that a charging and discharging system to be applied to an electric vehicle improve convenience with a simple configuration, for example.

It is desirable to provide a vehicle charging and discharging system that makes it possible to improve convenience with a simple configuration, and an electric vehicle including such a vehicle charging and discharging system.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. It is to be noted that the description is given in the following order.

FIG. 1 is a block diagram illustrating a schematic configuration example of an electric vehicle 1 according to an example embodiment of the disclosure, together with external elements. The electric vehicle 1 may be an EV (Electric vehicle) or a hybrid electric vehicle (HEV).

The electric vehicle 1 may include a vehicle body 10, a battery 11, a vehicle-side coil 12, a rectifier 13, an electric power output terminal 14, an inverter 15, relays 161 and 162, a variable resistor 17, and a control processor 18. Further, as illustrated in FIG. 1, external equipment 9 and an equipment-side coil 92 may be provided in the vicinity of the electric vehicle 1. The external equipment 9 may be installed on a ground G. The equipment-side coil 92 may be electrically coupled to the external equipment 9 via an external cable R9. Although details will be described later, the electric vehicle 1 is able to achieve both charging from and discharging to the external equipment 9 contactlessly via the vehicle-side coil 12 and the equipment-side coil 92.

In one embodiment, the rectifier 13, the inverter 15, the relay 162, the variable resistor 17, and the control processor 18 may serve together as a "vehicle charging and discharging system". In one embodiment, the vehicle-side coil 12 may serve as a "coil in the electric vehicle". In one embodiment, the relay 162 may serve as a "relay".

The battery 11 may store electric power to be used by the electric vehicle 1. The battery 11 may include, for example, any of various secondary batteries including, without limitation, a lithium ion battery. Although details will be described later, the electric power stored in the battery 11 is dischargeable to the external equipment 9 and feedable to an external device 8.

The external equipment 9 may be coupled to, for example, an electric power grid and allow the electric vehicle 1 to perform charging and discharging contactlessly, or wirelessly. For example, although details will be described later, contactless charging may be performed on the electric vehicle 1 from the external equipment 9, contactless discharging may be performed from the electric vehicle 1 to the external equipment 9, and furthermore, discharging may be performed from the external equipment 9 to the electric power grid. So-called vehicle-to-grid (V2G) is thereby achieved.

The external device 8 may be any of various home appliances, for example. Although details will be described later, electric power is fed from the electric vehicle 1 to the external device 8. So-called vehicle-to-load (V2L) is thereby achieved.

As illustrated in FIG. 1, the vehicle-side coil 12 may be disposed below the vehicle body 10 of the electric vehicle 1, for example. In one example, the vehicle-side coil 12 may be disposed to face the equipment-side coil 92 coupled to the external equipment 9. This allows contactless electric power feeding to be performed bidirectionally between the vehicle-side coil 12 and the equipment-side coil 92. Details will be described later.

The rectifier 13 is disposed on a charging path Rc through which the battery 11 is to be contactlessly charged from the external equipment 9 via the external cable R9, the equipment-side coil 92, and the vehicle-side coil 12. See FIG. 1. In one example, in FIG. 1, the rectifier 13 may be disposed between the vehicle-side coil 12 and the relay 161 on the charging path Rc. The relay 161 will be described later. The rectifier 13 may convert alternating-current (AC) electric power supplied contactlessly from the external equipment 9 into direct-current (DC) electric power, and output the DC electric power toward the battery 11. That is, the rectifier 13 may perform unidirectional AC-to-DC conversion, or rectification.

For convenience, in FIG. 1 and also in FIG. 2 and FIGS. 4 to 6 to be described later, an AC electric power path is indicated in a broken line, and a DC electric power path is indicated in a solid line, among paths each coupling any two or more of the external equipment 9, the equipment-side coil 92, components inside the electric vehicle 1, and the external device 8 to each other. The above-described charging path Rc, later-described discharging paths Rd1 and Rd2, and a later-described electric power feeding path Rs each extend across the AC electric power path and the DC electric power path. For convenience, these paths are each indicated in a broken line as a whole.

The electric power output terminal 14 allows for output of the electric power stored in the battery 11 to the outside. In some embodiments, the electric power output terminal 14 may be a connector. In one example, although details will be described later, electric power feeding to the external device 8 may be performed by outputting, via the inverter 15, the electric power stored in the battery 11 to the external device 8 from the electric power output terminal 14.

As illustrated in FIG. 1, the inverter 15 is disposed on a path R1 from the battery 11 to the electric power output terminal 14. The inverter 15 may convert DC electric power supplied from the battery 11 into AC electric power, and output the AC electric power. That is, the inverter 15 may perform a DC-to-AC conversion.

The relay 161 may be disposed between the rectifier 13 and the battery 11 on the above-described charging path Rc. The relay 161 may be switchable between an on-state, i.e., a state of connecting the charging path Rc, and an off-state, i.e., a state of interrupting the charging path Rc, in accordance with control by the control processor 18 to be described later.

As illustrated in FIG. 1, the relay 162 is disposed on a path R2 from the inverter 15 to the vehicle-side coil 12. The relay 162 may also be switchable between an on-state, i.e., a state of connecting the charging path R2, and an off-state, i.e., a state of interrupting the charging path R2, in accordance with control by the control processor 18.

As illustrated in FIG. 1, the variable resistor 17 may be disposed between the relay 162 and the vehicle-side coil 12 on the above-described path R2. Although details will be described later, a resistance value Rv of the variable resistor 17 may vary in accordance with control by the control processor 18. In other words, the resistance value Rv may be a variable resistance value.

In one embodiment, the above-described path R1 may serve as a "first path". In one embodiment, the above-described path R2 may serve as a "second path".

The control processor 18 may control various operations of the electric vehicle 1, including a travel operation, operations of charging and discharging the battery 11, and operations of various components, and perform various kinds of arithmetic processing. In one example, the control processor 18 controls an operation state of the relay 162 to allow the electric power stored in the battery 11 to be contactlessly discharged toward the external equipment 9 via the inverter 15, the relay 162, and the vehicle-side coil 12 on the path R2. In some embodiments, the control processor 18 may control each of the operation state of the relay 162 and the resistance value Rv of the variable resistor 17 to allow the electric power stored in the battery 11 to be contactlessly discharged to the external equipment 9 via the path R2 and also to be fed to the external device 8 from the electric power output terminal 14 via the path R1. Moreover, in some embodiments, the control processor 18 may set the resistance value Rv of the variable resistor 17 to allow the electric power feeding to the external device 8 to be preferentially executed as compared with the contactless discharging to the external equipment 9 when the contactless discharging to the external equipment 9 and the electric power feeding to the external device 8 are being performed in parallel.

Control processes to be performed by the control processor 18 on the components including, for example, the relays 161 and 162 and the variable resistor 17 will be described in detail later with reference to FIGS. 3A to 6.

The control processor 18 may include one or more processors or central processing units (CPUs) each executing a program, and one or more memories communicably coupled to the one or more processors. The memories may each include, for example, a random-access memory (RAM) that temporarily holds processing data, and a read-only memory (ROM) that contains the program.

Operations, workings, and some example effects of the present example embodiment will now be described in detail in comparison with a comparative example.

Figure 2:
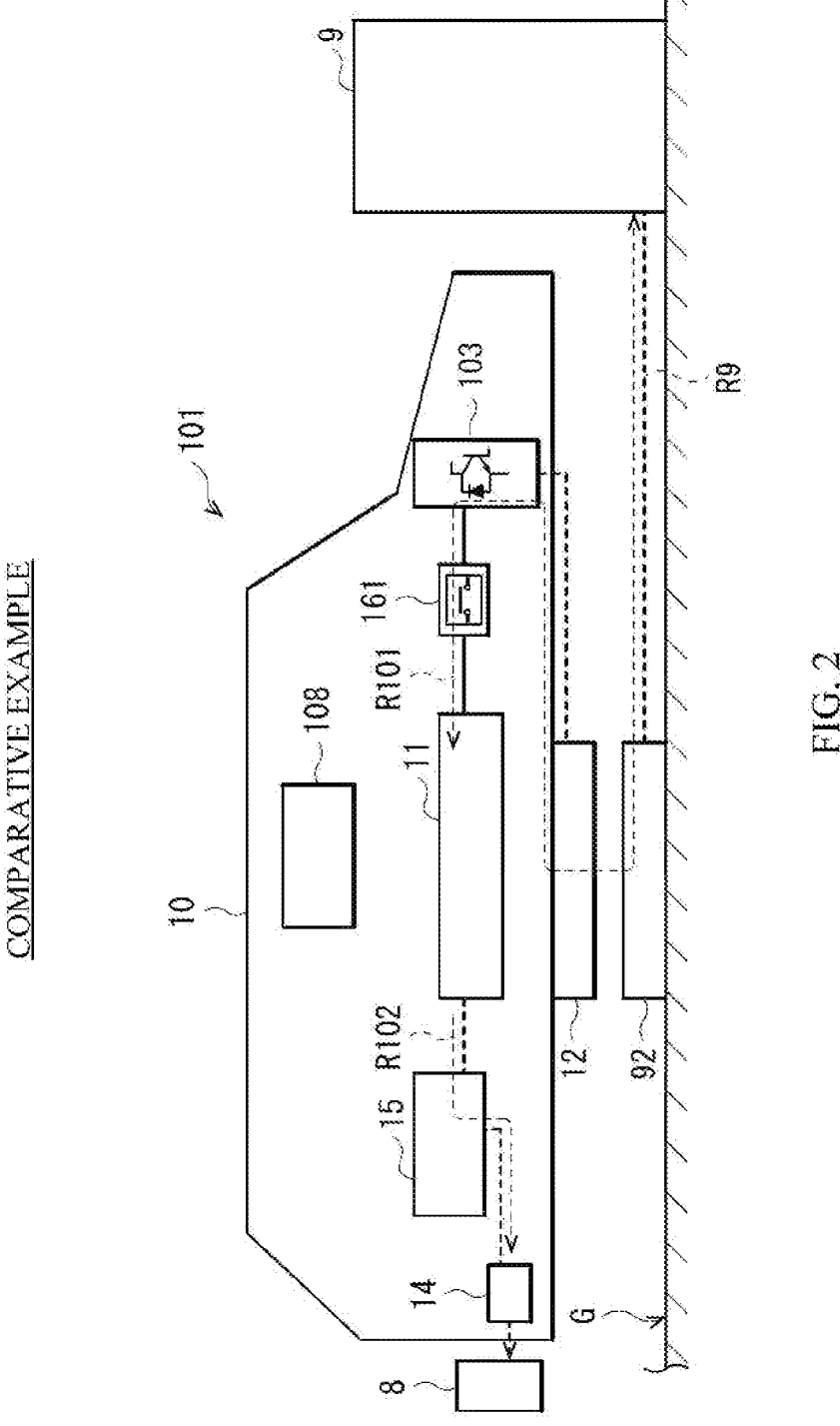
FIG. 2 is a block diagram illustrating a schematic configuration example of an electric vehicle according to a comparative example, together with the external elements.

FIG. 2 is a block diagram illustrating a schematic configuration example of an electric vehicle 101 according to a comparative example, together with the external elements. The electric vehicle 101 according to the comparative example corresponds to the electric vehicle 1 according to the present example embodiment illustrated in FIG. 1. The electric vehicle 101 has a configuration similar to that of the electric vehicle 1 except that a bidirectional inverter, i.e., a rectifier/inverter, 103 and a control processor 108 are provided in place of the rectifier 13 and the control processor 18, respectively, and that the relay 162 and the variable resistor 17 are omitted.

In the electric vehicle 101 of the comparative example, contactless charging and contactless discharging are performed via the bidirectional inverter 103 between the external equipment 9 and the battery 11 in the electric vehicle 101, and electric power feeding from the battery 11 to the external device 8 is also performed, in accordance with various kinds of control by the control processor 108.

For example, the contactless charging of the battery 11 from the external equipment 9 is performed via the equipment-side coil 92, the vehicle-side coil 12, the bidirectional inverter 103, and the relay 161, from the external equipment 9. See a path R101 in FIG. 2. In this case, the bidirectional inverter 103 performs an AC-to-DC conversion, or rectification, from AC electric power into DC electric power. Further, the contactless discharging of the battery 11 to the external equipment 9 is performed via the relay 161, the bidirectional inverter 103, the vehicle-side coil 12, and the equipment-side coil 92, from the battery 11. See the path R101 in FIG. 2. In this case, the bidirectional inverter 103 performs a DC-to-AC conversion from DC electric power into AC electric power, which is opposite to the above. Moreover, in the electric vehicle 101, the electric power feeding from the battery 11 to the external device 8 is performed via the inverter 15 and the electric power output terminal 14, from the battery 11. See a path R102 in FIG. 2. In such a manner, according to the comparative example, the contactless discharging to the external equipment 9 and the electric power feeding to the external device 8 are performed in addition to the currently available contactless charging. Accordingly, so-called V2G and V2L are achieved, which results in improved convenience.

According to the comparative example, the contactless charging and the contactless discharging are performed via the bidirectional inverter 103, as described above. The bidirectional inverter 103, however, is larger in size than the rectifier 13. Accordingly, providing the bidirectional inverter 103 would affect cost and weight as compared with when providing the unidirectional rectifier 13 as in the present example embodiment. Further, as described above, the bidirectional inverter 103 performs the DC-to-AC conversion, as well as the rectification, i.e., the AC-to-DC conversion similar to that to be performed by the rectifier 13. This would necessitate additional switching control specifically for the DC-to-AC conversion. For these reasons, it may be difficult in the comparative example to improve convenience with a simple configuration.

In contrast, the electric vehicle 1 according to the present example embodiment includes the unidirectional rectifier 13 on the above-described charging path Rc, the relay 162 on the path R2 from the inverter 15 to the vehicle-side coil 12, and the control processor 18 controlling, for example, the operation state of the relay 162. As a result, by a technique described in detail below, the present example embodiment achieves both the contactless discharging to the external equipment 9 and the electric power feeding to the external device 8, as well as the contactless charging of the battery 11.

A detailed description will be given below of a process example including an example of control processes to be performed by the control processor 18 in performing respective operations of the above-described contactless discharging and electric power feeding according to the present example embodiment, with reference to FIGS. 3A and 3B and FIGS. 4 to 6, in addition to FIG. 1.

Figure 3A:
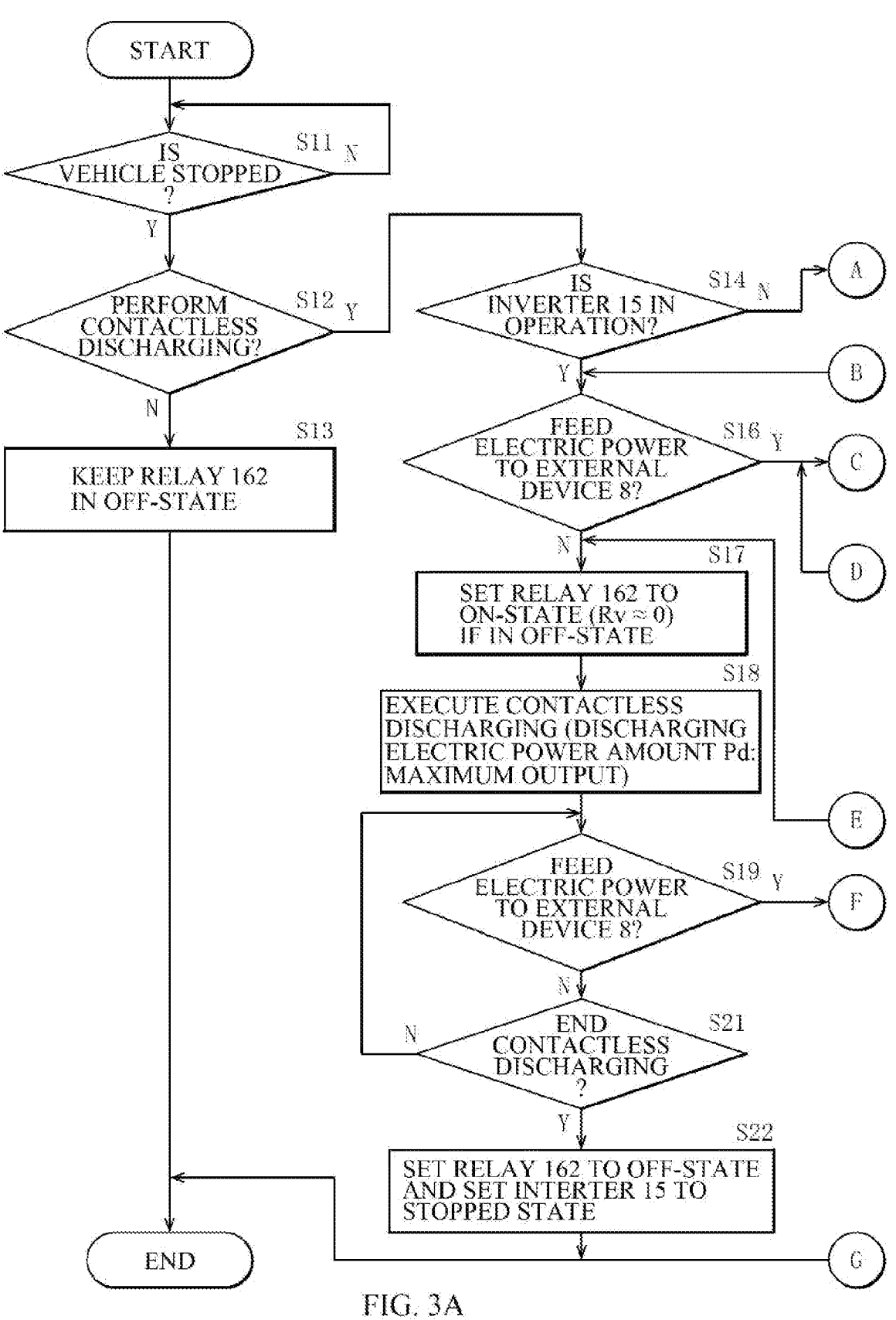
FIG. 3A is a flowchart illustrating a process example in performing operations including a discharging operation according to the example embodiment.
Figure 3B:
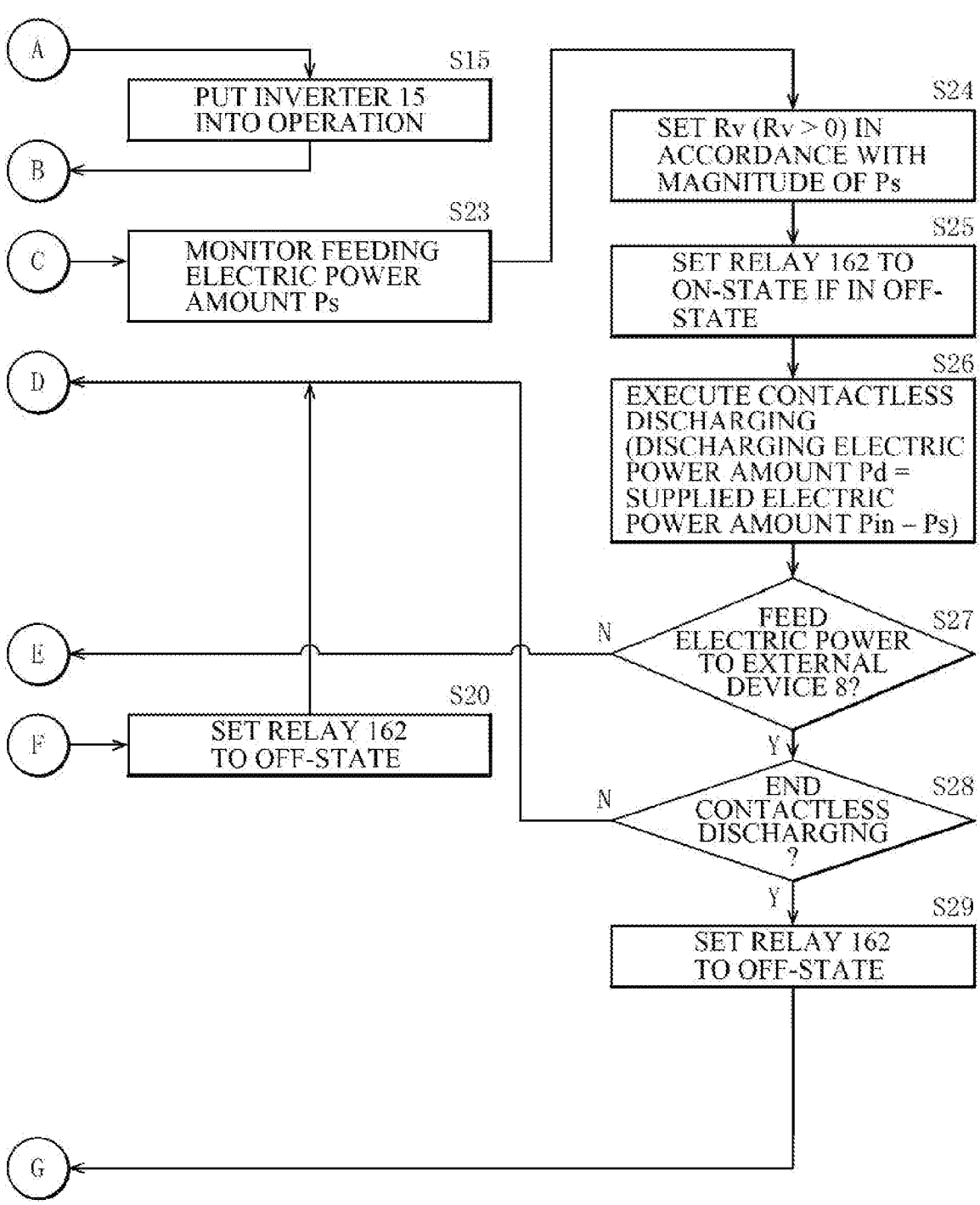
FIG. 3B is a flowchart illustrating a process example following FIG. 3A.
Figure 4:
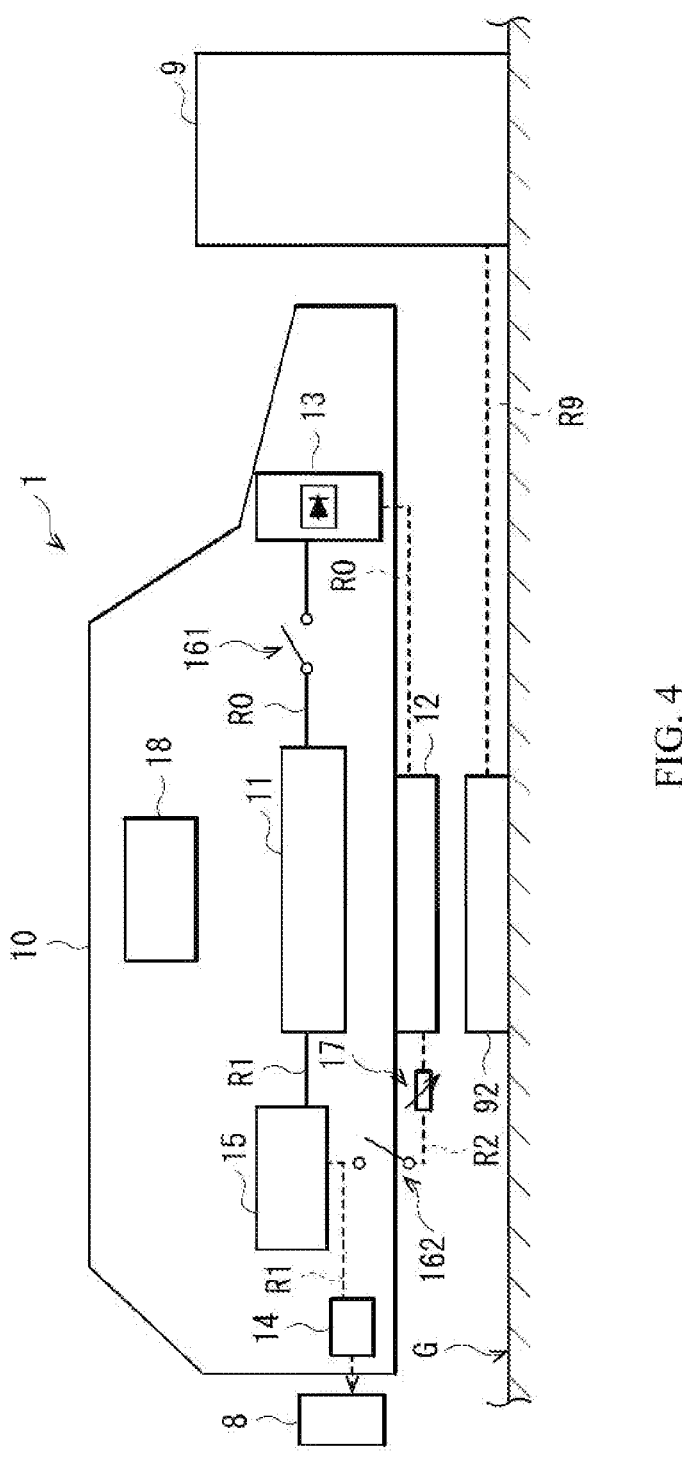
FIG. 4 is a block diagram illustrating an operation example in the course of a series of processes illustrated in FIGS. 3A and 3B.
Figure 5:
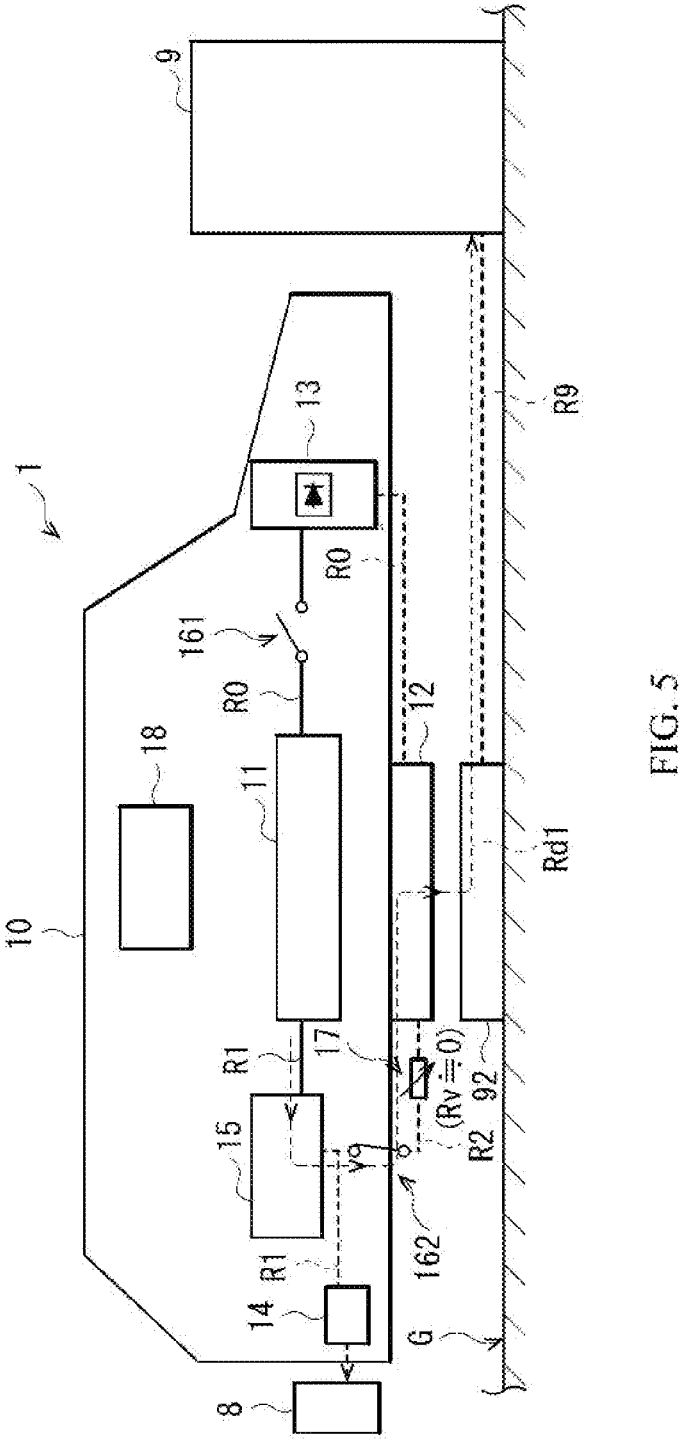
FIG. 5 is a block diagram illustrating another operation example in the course of the series of processes illustrated in FIGS. 3A and 3B.
Figure 6:
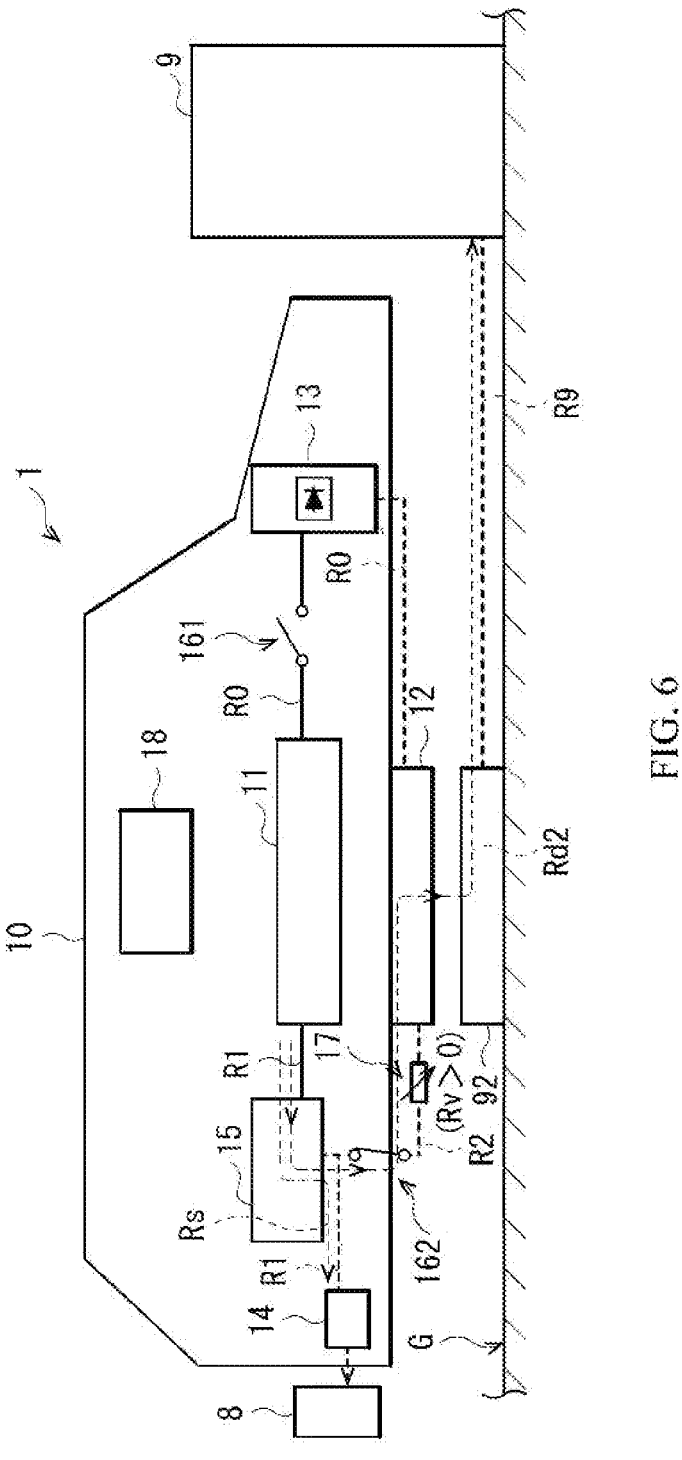
FIG. 6 is a block diagram illustrating still another operation example in the course of the series of processes illustrated in FIGS. 3A and 3B.

FIGS. 3A and 3B are flowcharts illustrating the process example in performing the discharging operation and the electric power feeding operation according to the present example embodiment. FIGS. 4 to 6 are block diagrams each illustrating an operation example in the course of processes illustrated in FIGS. 3A and 3B.

In a series of example processes illustrated in FIGS. 3A and 3B, first, the control processor 18 may determine whether the electric vehicle 1 is stopped (step S11 in FIG. 3A). If it is determined that the electric vehicle 1 is not stopped, i.e., is traveling (step S11: N), determination in this step S11 may be tried again.

If it is determined that the electric vehicle 1 is stopped (step S11: Y) as illustrated in, for example, FIG. 4, the flow may proceed to step S12 described below. Note that in FIG. 4, which illustrates an initial state while the vehicle 1 is stopped, the relays 161 and 162 may both be set to the off-state or interrupting state. The relay 161 may be kept in the off-state in each of the examples of FIGS. 4 to 6 described below.

In step S12 described above, the control processor 18 may determine whether to perform contactless discharging to the external equipment 9 in response to, for example, an operation instruction from a user of the electric vehicle 1. If it is determined not to perform the contactless discharging (step S12: N), the control processor 18 may keep the relay 162 in the off-state (step S13). In this case, the series of example processes illustrated in FIGS. 3A and 3B may thereafter end.

If it is determined to perform the contactless discharging described above (step S12: Y), the control processor 18 may next determine whether the inverter 15 is in operation (step S14). If it is determined that the inverter 15 is not in operation, i.e., is stopped (step S14: N), the control processor 18 may put the inverter 15 into operation (step S15 in FIG. 3B), and may cause the flow to proceed to step S16 described below.

If it is determined that the inverter 15 is in operation (step S14: Y), the control processor 18 may next determine whether to perform electric power feeding to the external device 8 (step S16) in response to, for example, an operation instruction from the user of the electric vehicle 1. If it is determined to perform the electric power feeding to the external device 8 (step S16: Y), the flow may proceed to step S23 and subsequent steps in FIG. 3B, which will be described later.

If it is determined not to perform the electric power feeding to the external device 8 (step S16: N), the control processor 18 may next set the relay 162 to the on-state or connecting state, if the relay 162 is in the off-state (step S17). At this time, the resistance value Rv of the variable resistor 17 may be set to a value approximately equal to zero (Rv≈0). Thereafter, as indicated in the discharge path Rd1 in FIG. 5, for example, the control processor 18 may execute the contactless discharging to the external equipment 9 via the above-described path R2, setting a discharging electric power amount Pd to a maximum output (step S18). The discharging electric power amount Pd refers to an amount of electric power to be discharged to the external equipment 9.

Thereafter, the control processor 18 may again determine whether to perform the electric power feeding to the external device 8 (step S19). If it is determined to perform the electric power feeding to the external device 8 (step S19: Y), the control processor 18 may set the relay 162 to the off-state (step S20 in FIG. 3B), and may cause the flow to proceed to step S23 and the subsequent steps in FIG. 3B, which will be described later.

If it is determined not to perform the electric power feeding to the external device 8 (step S19: N), the control processor 18 may next determine whether to end the contactless discharging to the external equipment 9 (step S21) in response to, for example, an operation instruction from the user of the electric vehicle 1. If it is determined not to end the contactless discharging (step S21: N), the flow may return to step S19 described above.

If it is determined to end the contactless discharging (step S21: Y), the control processor 18 may set the relay 162 to the off-state and set the inverter 15 to a stopped state (step S22). In this case, the series of example processes illustrated in FIGS. 3A and 3B may thereafter end.

In step S23 in FIG. 3B described above, the control processor 18 may monitor a feeding electric power amount Ps through arithmetic processing or other processing. The feeding electric power amount Ps refers to an amount of electric power being fed to the external device 8. For example, if the external device 8 is uncoupled to the electric power output terminal 14 or operation of the external device 8 is stopped, the feeding electric power amount Ps may be calculated as zero.

Next, in accordance with magnitude of the feeding electric power amount Ps thus monitored, the control processor 18 may set the resistance value Rv of the variable resistor 17 to a value greater than zero (Rv>0) (step S24). Thereafter, the control processor 18 may set the relay 162 to the on-state, if the relay 162 is in the off-state (step S25).

Thereafter, as indicated in the discharging path Rd2 in FIG. 6, for example, the control processor 18 may execute the contactless discharging to the external equipment 9 via the above-described path R2 (step S26). At this time, as indicated in the electric power feeding path Rs in FIG. 6, for example, the electric power feeding to the external device 8 via the above-described path R1 may also be being performed in parallel. The discharging electric power amount Pd at this time may be a difference electric power amount obtained by subtracting the feeding electric power amount Ps from a supplied electric power amount Pin. The supplied electric power amount Pin refers to an amount of electric power being supplied or outputted from the inverter 15. That is, the discharging electric power amount Pd at this time may be set to such a difference electric power amount to thereby satisfy a relationship Pd=Pin−Ps.

Thereafter, the control processor 18 may again determine whether to perform the electric power feeding to the external device 8 (step S27). If it is determined not to perform the electric power feeding to the external device 8 (step S27: N), the flow may proceed to step S17 in FIG. 3A described above.

If it is determined to perform the electric power feeding to the external device 8 (step S27: Y), the control processor 18 may next determine whether to end the contactless discharging to the external equipment 9 (step S28) in response to, for example, an operation instruction from the user of the electric vehicle 1. If it is determined not to end the contactless discharging (step S28: N), the flow may return to step S23 described above.

f it is determined to end the contactless discharging (step S28: Y), the control processor 18 may set the relay 162 to the off-state (step S29). In this case, the series of example processes illustrated in FIGS. 3A and 3B may thereafter end.

The description of the series of example processes illustrated in FIGS. 3A and 3B thus ends.

According to the example embodiment described above, the electric vehicle 1 includes the unidirectional rectifier 13 on the charging path Rc and the relay 162 on the path R2 from the inverter 15 to the vehicle-side coil 12. The operation state of the relay 162 is controlled to allow the electric power stored in the battery 11 to be contactlessly discharged to the external equipment 9 via the inverter 15, the relay 162, and the vehicle-side coil 12 on the path R2.

Accordingly, in the example embodiment described above, contactless discharging of the battery 11 to the external equipment 9 is achieved with a simple configuration as compared with when the bidirectional inverter 103 is provided in place of the unidirectional rectifier 13 as in the comparative example described above, for example. For example, employing the rectifier 13 results in reductions in size, cost, and weight, and makes it unnecessary to perform additional switching control specifically for DC-to-AC conversion, as compared with when employing the bidirectional inverter 103. Contactless discharging is thus achieved with a general-purpose configuration. This helps to improve convenience with a simple configuration, as compared with the above-described comparative example.

In some embodiments, the operation state of the relay 162 and the resistance value Rv of the variable resistor 17 may each be controlled to allow for the above-described contactless discharging to the external equipment 9 and also the electric power feeding to the external device 8 from the electric power output terminal 14 via the path R1. By performing such control, the contactless discharging to the external equipment 9 and the electric power feeding to the external device 8 are both achieved with a simple configuration. This helps to further improve convenience with a simple configuration.

Moreover, in some embodiments, the resistance value Rv of the variable resistor 17 may be set to allow the electric power feeding to the external device 8 to be preferentially executed as compared with the contactless discharging to the external equipment 9. Accordingly, when executing both the contactless discharging to the external equipment 9 and the electric power feeding to the external device 8, preferential execution of the electric power feeding to the external device 8 is easily achievable in accordance with such setting of the resistance value Rv. This helps to achieve further improvement in convenience with a simple configuration.

Although some example embodiments of the disclosure have been described hereinabove, the disclosure is not limited to the foregoing example embodiments, and various modifications may be made thereto.

For example, the configurations, including type, shape, arrangement, and the number of pieces, of respective components of the electric vehicle 1 and the vehicle charging and discharging system are not limited to those described in the example embodiments. The configuration of each of the components may be modified by employing any other type, shape, arrangement, number of pieces, etc. In addition, values, ranges, magnitude relationships, etc., of various parameters described in the example embodiments are non-limiting, and any other values, ranges, magnitude relationships, etc. may be employed.

For example, an example in which the variable resistor 17 may be disposed on the path R2 from the inverter 15 to the vehicle-side coil 12 has been described in the example embodiment above; however, this is non-limiting. In some embodiments, the variable resistor 17 may be omitted, for example. In some embodiments, the variable resistor 17 may be replaced with a semiconductor switch or any other device that is able to reduce a resistance loss, for example.

For example, although the process example including the example of the control processes to be performed by the control processor 18 in performing the charging and discharging operations has been described in the example embodiment above, such an example is non-limiting. In some embodiments, any of other techniques may be employed to perform the processes in performing the charging and discharging operations. In some embodiments, the process of feeding electric power from the electric vehicle 1 to the external device 8 may be eliminated, for example.

The series of processes described in the example embodiment above may be performed by hardware such as circuitry, or by software such as a program. When the series of processes is to be performed by software, the software may include a group of programs for causing a computer to execute various operations. Each program may be a built-in program that is incorporated in the computer in advance for use. Each program may alternatively be installed in the computer from a network or a computer-readable medium for use, for example.

In addition, the various examples described hereinabove may be applied in any combination. Further, the disclosure encompasses any possible combination of some or all of the various embodiments described herein and incorporated herein.

The vehicle charging and discharging system and the electric vehicle according to at least one embodiment of the disclosure each make it possible to improve convenience with a simple configuration.

The effects described herein are mere examples and non-limiting, and other effects may be achieved.

The control processor 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control processor 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control processor 18 illustrated in FIG. 1.

The invention claimed is:

1. A vehicle charging and discharging system to be applied to an electric vehicle, the vehicle charging and discharging system comprising:

a unidirectional rectifier disposed on a charging path through which a battery of the electric vehicle is to be contactlessly charged from external equipment via a coil in the electric vehicle;

an inverter disposed on a first path from the battery to an electric power output terminal of the electric vehicle, the electric power output terminal allowing for output of electric power stored in the battery;

a relay disposed on a second path from the inverter to the coil; and a control processor configured to control an operation state of the relay to allow the electric power stored in the battery to be contactlessly discharged to the external equipment via the inverter, the relay, and the coil on the second path while simultaneously to be fed to an external device via the first path.

2. The vehicle charging and discharging system according to claim 1, further comprising a variable resistor on the second path, wherein the control processor is configured to control each of the operation state of the relay and a resistance value of the variable resistor to allow the electric power stored in the battery to be contactlessly discharged to the external equipment via the second path and also to be fed to the external device from the electric power output terminal via the first path.

3. The vehicle charging and discharging system according to claim 2, wherein the control processor is configured to set the resistance value of the variable resistor to allow feeding of the electric power to the external device to be preferentially executed as compared with contactless discharging of the electric power to the external equipment.

4. The vehicle charging and discharging system according to claim 2, wherein the control processor is configured to set a difference electric power amount as a discharging electric power amount, the discharging electric power amount being an amount of electric power to be contactlessly discharged to the external equipment, the difference electric power amount being a resultant of subtraction of a feeding electric power amount from a supplied electric power amount, the feeding electric power amount being an amount of electric power being fed to the external device, the supplied electric power amount being an amount of electric power being supplied from the inverter, and set the resistance value of the variable resistor in accordance with magnitude of the feeding electric power amount.

5. The vehicle charging and discharging system according to claim 3, wherein the control processor is configured to set a difference electric power amount as a discharging electric power amount, the discharging electric power amount being an amount of electric power to be contactlessly discharged to the external equipment, the difference electric power amount being a resultant of subtraction of a feeding electric power amount from a supplied electric power amount, the feeding electric power amount being an amount of electric power being fed to the external device, the supplied electric power amount being an amount of electric power being supplied from the inverter, and set the resistance value of the variable resistor in accordance with magnitude of the feeding electric power amount.

6. An electric vehicle comprising a vehicle charging and discharging system to be applied to an electric vehicle, the vehicle charging and discharging system comprising:

a unidirectional rectifier disposed on a charging path through which a battery of the electric vehicle is to be contactlessly charged from external equipment via a coil in the electric vehicle;

an inverter disposed on a first path from the battery to an electric power output terminal of the electric vehicle, the electric power output terminal allowing for output of electric power stored in the battery;

a relay disposed on a second path from the inverter to the coil; and a control processor configured to control an operation state of the relay to allow the electric power stored in the battery to be contactlessly discharged to the external equipment via the inverter, the relay, and the coil on the second path, while simultaneously being fed to an external device via the first path.

* * * * *